(12) United States Patent
Barimani et al.

(10) Patent No.: US 10,735,042 B2
(45) Date of Patent: Aug. 4, 2020

(54) VANDALISM-RESISTANT INFORMATION INTERFACE APPARATUS FOR AN EARTH WORKING MACHINE

(71) Applicant: Wirtgen GmbH, Windhagen (DE)

(72) Inventors: Cyrus Barimani, Königswinter (DE); Stephan Drumm, Ockenfels (DE)

(73) Assignee: Wirtgen GmbH (DE)

( * ) Notice: Subject to any disclaimer, the term of this patent is extended or adjusted under 35 U.S.C. 154(b) by 0 days.

(21) Appl. No.: 16/243,466

(22) Filed: Jan. 9, 2019

(65) Prior Publication Data

US 2019/0245573 A1 Aug. 8, 2019

(30) Foreign Application Priority Data

Feb. 8, 2018 (DE) .................. 10 2018 202 015

(51) Int. Cl.
*H05K 5/00* (2006.01)
*H04B 1/3888* (2015.01)
(Continued)

(52) U.S. Cl.
CPC ........... *H04B 1/3888* (2013.01); *B60K 35/00* (2013.01); *B60K 37/04* (2013.01); *B60K 37/06* (2013.01);
(Continued)

(58) Field of Classification Search
CPC ........ H04B 1/3888; E02F 9/2004; E02F 9/24; H05K 5/0217; H05K 5/0221; H05K 5/0226; H05K 7/1408
See application file for complete search history.

(56) References Cited

U.S. PATENT DOCUMENTS 3,583,519 A * 6/1971 Meyer .................... B60K 37/00
 180/90
3,913,701 A * 10/1975 Williams ............... B60K 37/00
 180/90
(Continued)

OTHER PUBLICATIONS

European search report of corresponding EP 19151977, dated Apr. 26, 2019, 7 pages (not prior art).

*Primary Examiner* — Hoa C Nguyen
*Assistant Examiner* — Keith DePew
(74) *Attorney, Agent, or Firm* — Lucian Wayne Beavers; Patterson Intellectual Property Law, PC (57) ABSTRACT

An information interface apparatus (27, 27*a*) in particular for an operator's platform (24) of an earth working machine (10), for example a road milling machine, recycler, stabilizer, or surface miner, having an interface subassembly (52) encompassing a housing (54) and a functional surface (56) that is received in the housing (54) and embodied to input and/or output information, is characterized in that the information interface apparatus (27, 27*a*) comprises a protective plate (58), embodied separately from the interface subassembly (52), to cover the functional surface (56); the protective plate (58) comprising an anchoring portion (64) with which the protective plate (58) is anchorable on a counterpart anchoring portion (68) of the interface subassembly (52) and the anchoring portion (64) is thus securable against removal from the functional surface (56); and the protective plate (58) comprising a latching portion (66), different from the anchoring portion (64), with which the protective plate (58) is releasably latchable on a counterpart latching portion (72) of the interface subassembly (52) and the latching portion (66) is thus securable against removal from the functional surface (56).

21 Claims, 5 Drawing Sheets

(51) Int. Cl.
  *B60K 37/06*    (2006.01)
  *B60K 37/04*    (2006.01)
  *B60K 35/00*    (2006.01)
  *E02F 9/20*     (2006.01)
  *E02F 9/24*     (2006.01)

(52) U.S. Cl.
  CPC .............. *E02F 9/2004* (2013.01); *E02F 9/24* (2013.01); *B60K 2370/61* (2019.05); *B60K 2370/682* (2019.05); *B60K 2370/693* (2019.05); *B60Y 2200/41* (2013.01)

(56) References Cited

U.S. PATENT DOCUMENTS

| | | | | |
|---|---|---|---|---|
| 4,112,718 | A * | 9/1978 | Logsdon | B60K 37/00 70/159 |
| 4,131,173 | A * | 12/1978 | Boersma | B60K 35/00 180/90 |
| 4,549,625 | A * | 10/1985 | Tindall | B60K 35/00 180/90 |
| 4,776,750 | A * | 10/1988 | Griswold, Jr. | E02F 9/205 37/348 |
| 4,888,968 | A * | 12/1989 | Azvedo | B60R 25/007 70/163 |
| 5,165,262 | A * | 11/1992 | Brem | B60R 25/007 70/158 |
| 5,555,157 | A * | 9/1996 | Moller | G06F 1/1626 312/223.2 |
| 9,650,759 | B2 * | 5/2017 | Dolan | E02F 9/205 |
| 10,069,284 | B1 * | 9/2018 | Paul | H02B 1/44 |
| 2005/0053447 | A1 * | 3/2005 | Bucher | A01D 34/006 411/470 |
| 2013/0135799 | A1 * | 5/2013 | Oi | E05C 3/004 361/679.01 |
| 2015/0299988 | A1 * | 10/2015 | Abe | B60R 25/2063 180/315 |
| 2015/0321597 | A1 * | 11/2015 | Knight | H04B 1/034 701/2 |
| 2016/0042202 | A1 * | 2/2016 | Murray | G06F 1/203 320/108 |
| 2019/0127952 | A1 * | 5/2019 | Pfaff | E02F 9/205 |
| 2019/0132970 | A1 * | 5/2019 | Rzepecki | H05K 5/0217 |

\* cited by examiner

VANDALISM-RESISTANT INFORMATION INTERFACE APPARATUS FOR AN EARTH WORKING MACHINE

BACKGROUND OF THE INVENTION

1. Field of the Invention

The present invention relates to an information interface apparatus, having an interface subassembly encompassing a housing and a functional surface that is received in the housing and embodied to input and/or output information. The information interface apparatus of the present invention is intended in particular for an earth working machine, for example a road milling machine, recycler, stabilizer, or surface miner, and particularly preferably for use therein in the region of an operator's platform or of an external control panel of the earth working machine.

2. Description of the Prior Art

Information interface apparatuses of the kind recited above are already in use on operator's platforms of earth working machines. They serve principally to output information to a machine operator, but can additionally or alternatively be embodied for input of information by the machine operator to a control apparatus.

An information interface apparatus of the kind recited above is known, for example on the Applicant's model W 150 CF cold road milling machine, in the form of a monitor for presenting camera views. On the earth working machine, a camera for observing at least one region that is poorly or not visible to the machine operator from the operator's platform is arranged on the earth working machine, which camera optically senses the region and reproduces it as an image on the monitor. In this known application, the functional surface is an image output surface of the monitor.

Also known from the W 150 CF as an example of a further information interface apparatus is an operator display of the "LEVEL PRO PLUS" leveling system. The functional surface of the operator display, facing toward the machine operator on the operator's platform during operation as intended, encompasses a display region for displaying leveling data as well as operating elements for inputting data or information.

Vandalism is becoming an increasingly frequent problem with earth working machines at construction sites during times of unmonitored non-use, as unauthorized persons enter the construction site and tamper with the machinery parked there. Some persons also attempt to gain access to the operator's platform of an earth working machine. These persons as a rule are motivated not by technical curiosity but by destructiveness, so that there is a great deal of interest in protecting easily damaged, sensitive subassemblies, for example the aforementioned information interface apparatus, as effectively as possible from attack by vandals. Technologically sensitive apparatuses in particular, such as monitors and display apparatuses, which for ergonomic reasons often protrude with respect to other devices on the operator's platform so that their information can be more effectively acquired by the machine operator, are a favorite target of attack by vandals.

SUMMARY OF THE INVENTION

The object of the present invention is therefore to enhance the vandalism resistance of the previously recited information interface apparatus.

This object is achieved according to the present invention by the fact that the information interface apparatus comprises a protective plate, embodied separately from the interface subassembly, to cover the functional surface; the protective plate comprising an anchoring portion with which the protective plate is anchorable on a counterpart anchoring portion of the interface subassembly and the anchoring portion is thus securable against removal from the functional surface; and the protective plate comprising a latching portion, different from the anchoring portion, with which the protective plate is releasably latchable on a counterpart latching portion of the interface subassembly and the latching portion is thus securable against removal from the functional surface.

Thanks to the embodiment according to the present invention, the functional surface is coverable by the protective plate regardless of which functional elements and/or functional regions it comprises for information exchange with the machine operator. The result is that sensitive portions of the functional surface, which because of their design can already be damaged with little exertion of force or criminal energy, cannot readily be accessed by vandals approaching the information interface apparatus in unauthorized fashion.

At the anchoring portion and the latching portion, the protective plate is fixedly connectable to the interface subassembly at two separate sites embodied at a distance from one another, so that a vandal cannot readily remove the protective plate from the interface subassembly in order to allow access to the functional regions of the functional surface which are concealed and protected by the protective plate. Of the aforesaid protective plate portions, the anchoring portion preferably creates the more durable connection to the interface subassembly. The latching portion ensures that the protective plate is releasable from its covering position that covers the functional surface. The fact that the protective plate is releasable from the interface subassembly at the latching portion does not necessarily mean that the protective plate is releasable by anyone.

The anchoring portion and the latching portion furnish two portions, each of which is preferably securable to the interface subassembly by way of a positive engagement with the interface subassembly. The protective plate as a whole is thus fastenable on the interface subassembly by means of the two portions, in a manner that covers the functional surface, with a high degree of resistance to external attack.

Each portion from among the counterpart anchoring portion and counterpart latching portion of the interface subassembly can be embodied entirely on the housing or entirely on the functional surface or on both the housing and the functional surface. Because the housing, preferably constituting an exclusively or at least predominantly passive mechanical component, can be embodied substantially more robustly than the functional surface, which is sensitive due to the arrangement of electrical and/or electronic components, both the counterpart anchoring portion and the counterpart latching portion are embodied preferably at least predominantly, by preference entirely, on the housing.

When the counterpart anchoring portion and/or the counterpart latching portion is or are also constituted by a region of the functional surface, preferably that region of the functional surface which contributes to the respective portion is coverable by the protective plate in the covering position.

As has already been presented using the examples of the existing art described previously, the functional surface can be or encompass, inter alia, an image output surface of a display apparatus, and/or can be or encompass an audio output surface, for example a loudspeaker cover, and/or can be or encompass at least one operating element, such as a button, keypad, touchscreen, rotary controller, and the like, for inputting data and information.

Preferably the functional surface is substantially flat or encompasses flat surface regions that are arranged at a distance from one another orthogonally to their flat area of extent. A slightly curved functional surface, as is known e.g. from display screens, is also not to be excluded.

For maximally secure and durable arrangement of the protective plate in the covering position on the interface subassembly, the anchoring portion and the latching portion are preferably provided at mutually opposite ends, in particular longitudinal ends, of the protective plate. According to a further preferred embodiment the protective plate can have a rectangular basic conformation, i.e. it comprises four edge regions of which each two non-adjacent edge regions are parallel to one another and of which each two adjacent edge regions are oriented substantially orthogonally to one another. The corners at which two edge regions meet one another can be rounded in order to reduce a possible risk of injury when handling the protective plate.

The protective plate, like the functional surface, can be of substantially flat configuration. The protective plate has a functional-surface side that faces toward the functional surface and is located opposite it when the protective plate, in its covering position, is covering the functional surface. With its visible side located oppositely from the functional-surface side, the protective plate in the covering position faces away from the functional surface. As a rule, the visible side is the accessible side of the protective plate arranged on the interface subassembly. The protective plate can have two identically configured sides, each of which can be a functional-surface side or visible side depending on the orientation of the protective plate in the covering position.

The protective plate is preferably flat, and/or configured complementarily to the topology of the functional surface, on the functional-surface side, so that the protective plate can be arranged on the interface subassembly at the shortest possible distance from the functional surface, preferably at least locally abuttingly against it. "Complementarily" means here that where the functional surface has elevations, the protective plate has a depression receiving the elevation; and/or that in the context of a protective plate arranged on the interface subassembly in order to cover the functional surface, a gap between the protective plate and the functional surface exhibits, regardless of the location considered, a substantially constant gap dimension that can also be zero.

In order to increase the flexural stiffness of the protective plate around a flexural axis parallel to the outer surface of the visible side, the visible side of the protective plate can comprise at least one stiffening configuration, for example protrusions and/or ribs, that project from a base region. In order to make tool access at such a stiffening configuration more difficult, the stiffening configuration is preferably connected via a bevel to the base region that adjoins it. The bevel, which preferably extends from the base region over the entire height of the stiffening configuration and thus constitutes the entire flank surface of the stiffening configuration, preferably encloses an angle of 130° or more with that outer surface of the base region which adjoins it.

The functional surface has an output side facing away from the housing during operation as intended, and a technology side located oppositely therefrom and facing toward the housing. Electrical and electronic circuits and components that are necessary for operation of the functional surface can be received between the technology side and the housing. The housing preferably surrounds the technology side of the functional surface in the manner of a shell or hood.

The output side is that side of the functional surface which is visible and accessible to the machine operator during operation. For easier attachment of the protective plate to the interface subassembly and in particular to the housing, provision can be made that the housing projects beyond the output side. The housing part that projects beyond the output side can then comprise the counterpart anchoring portion and/or the counterpart latching portion.

For establishment of a particularly secure and durable positively engaged connection between the anchoring portion and the counterpart anchoring portion, according to a preferred refinement of the invention at least one portion from among the anchoring portion and counterpart anchoring portion comprises a protrusion and/or a groove. The respective other portion from among the anchoring portion and counterpart anchoring portion can also, but does not need to, comprise a recess into which a protrusion of the one portion can engage.

A particularly advantageous positive anchoring engagement between the anchoring portion and counterpart anchoring portion is achievable when the counterpart anchoring portion comprises a protrusion and a groove. The protrusion and the groove are thus embodied on the interface subassembly. For reasons already presented above, the protrusion is preferably embodied on the housing. The protrusion preferably extends parallel to the functional surface so that the protrusion can constitute the groove together with a portion of the housing, and in that case preferably integrally, and/or with a portion of the functional surface. The anchoring portion of the protective plate can be introducible into that groove for positively engaged anchoring of the protective plate on the interface subassembly. The protective plate can thus be brought very close to the functional surface. Because the groove can in fact be delimited by the functional surface, the protective plate can be brought toward the functional surface to the point of making contact. Particularly preferably the anchoring portion is constituted, simply but effectively, by an edge portion of the protective plate. The edge portion that constitutes the anchoring portion does not itself need to be equipped as such with one or several anchoring configurations, but can be a flat edge portion bordered in straight-line fashion. For positive engagement with a protrusion of the counterpart anchoring portion it can be recessed, in particular complementarily to the protrusion.

In addition to the anchoring engagement implementable by way of the anchoring portion and the counterpart anchoring portion, the releasable latching engagement between the latching portion and the counterpart latching portion is the second engagement that, in accordance with the present invention, secures the protective plate in the covering position on the interface subassembly. The latching engagement will therefore be discussed below. Reference is made expressly to the fact that the latching engagement can be configured independently of the anchoring engagement, i.e. the latching engagement can be configured as described below in accordance with a preferred refinement, with no need for the anchoring engagement to be configured as described above.

According to an advantageous refinement of the present invention, one portion from among the latching portion and counterpart latching portion comprises a latch configuration displaceable between a latching position and a release position. As a result, the latching portion not only can be fastened securely on the counterpart latching portion but also can be quickly released from the counterpart latching portion. Operational readiness of the information interface apparatus can thus quickly be established starting with a functional surface covered by the protective apparatus.

In the latching position the latch configuration is preferably arranged (when the anchoring portion is anchored on the counterpart anchoring portion) to establish with the respective other portion from among the latching portion and counterpart latching portion a positive engagement that prevents removal of the latching portion from the functional surface, whereas when the latch configuration is in the release position (when in turn the anchoring portion is anchored on the counterpart anchoring portion) the latching portion is removable from the functional surface. What can be achieved thereby is that the anchoring portion can be removed from an anchoring engagement with the counterpart anchoring portion only when the latching portion is not in latching engagement with the counterpart latching engagement.

The latch configuration is preferably embodied on the housing and is thus part of the counterpart latching portion. The latching portion of the protective plate can then, like the anchoring portion as well, be constituted in simple but effective fashion by an edge portion of the protective plate, with no special latch configuration. It can in turn be bordered in flat and straight-line fashion, and particularly preferably can be oriented parallel to the edge portion that forms the anchoring portion. For an enhanced protective effect, the edge portion that constitutes the latching portion is covered over its entire length by the latch configuration when the protective plate is in the covering position and the latch configuration is in the latching position.

When the latch configuration is embodied on the housing, it preferably also comprises a protrusion that extends parallel to the functional surface in the latching position and forms a groove together with the housing and/or with the functional surface. In contrast to the protrusion of the counterpart anchoring portion, however, the protrusion of the latch configuration is movable relative to the functional surface and relative to the remainder of the housing. The groove depth directions of the grooves respectively constituted by the counterpart anchoring portion on the one hand and the counterpart latching portion on the other hand are preferably directed oppositely to one another. Their respective groove bottoms are preferably mutually parallel and face toward the respective other groove bottom. When the groove bottom of one groove of the counterpart latching portion is movable together with the latch configuration, the statement above applies when the latch configuration is located in the latching position.

To prevent unauthorized persons from releasing a latching engagement established between the latching portion and the counterpart latching portion, provision can be made that in order to inhibit a displacement movement, the latch configuration is lockable by means of a locking apparatus provided on the interface subassembly and/or on the protective plate.

In principle, the locking apparatus can encompass a lock that comprises a movable bolt that selectably enables or inhibits the displacement movement of the latch configuration using a secure locking mechanism associated with the lock, for example in the form of a mechanical locking contour of a key or in the form of a data code of a data medium, for instance a magnetic card. The physical secure locking mechanism of a key, which dispenses with an energy supply, is preferred in this context.

Complex secure locking mechanisms are often not necessary, however, for example because the information interface apparatus is already located in an operator's platform that is itself separately secured. Sufficient securing of a latching engagement against unauthorized release thereof can be implemented by the fact that one support structure from among the interface subassembly and/or protective plate, which carries the latch configuration displaceably relative to it and constitutes part of the locking apparatus, comprises a locking body that is received in the support structure displaceably between a locking position in which it inhibits a displacement movement of the latch configuration and an enabling position in which it permits a displacement movement of the latch configuration. The latch configuration and/or a latch component that (preferably integrally) comprises the latch configuration, constituting a further part of the locking apparatus, preferably comprises a locking recess which is movable with the latch configuration and into which the locking body projects in the locking position so as to inhibit the displacement movement. The locking body can thus, in its locking position, constitute a physical barrier to a displacement movement of the latch configuration. In the enabling position the locking body preferably does not project into the locking recess, so that a displacement movement by the locking body is then not prevented.

Because of the greater robustness that is achievable, the support structure is preferably constituted by the interface subassembly, particularly preferably by a housing portion that is immovable relative to the functional surface.

Preferably the locking body is not visible from outside when the latch configuration is in the latching position, particularly preferably also not visible when the latch configuration is in the release position. In order to make it difficult to unlock the latch configuration, the locking body can be displaceable from the locking position into the enabling position only by way of an unlocking body. Provision can be made for this purpose that the locking recess comprises a locking body opening through which the locking body enters into and emerges from the locking recess. The locking recess can likewise comprise an unlocking opening, different from the locking body opening, through which an unlocking body is introducible in order to push the locking body out of the locking recess thereinto. The locking body and the unlocking body are therefore preferably introducible into the locking recess in different, preferably opposite, directions.

In order to push the locking body out of the locking position, the latch configuration and/or a latch component displaceable together with the latch configuration can comprise an unlocking channel that at one end opens at the unlocking opening into the locking recess, and at the other end opens at an outer surface of the information interface apparatus into an introduction opening. By way of that unlocking channel, the unlocking body can be introducible from outside into the locking recess. Preferably the unlocking body is introducible into the locking recess only through that unlocking channel.

For maximally automatic securing of the protective plate in the covering position on the interface subassembly, and in order to lock the latch configuration without further manipulation by an operator, preferably on the one hand the latch configuration is preloaded into the latching position and/or on the other hand the locking body is preloaded into the locking position.

In order to be able to ensure that the locking body is pushable by the unlocking body in defined fashion out of the locking position, according to a preferred refinement the locking body is received in the support structure in a receiving recess displaceably only along a predetermined linear, in particular straight-line, trajectory. The locking body is therefore, preferably only, translationally movable. To allow the locking body to be pushed out of the locking position into its enabling position with as little applied force as possible, the unlocking channel and the receiving recess preferably align with one another when the locking body is in the locking position.

Thanks to the provision of the receiving recess in which the locking recess can be received so as to project to different depths depending on the position that is assumed, the length of the unlocking body can serve as a securing locking mechanism having a low level of security. If the unlocking body is too short, it does not push the locking body completely out of the locking recess even when maximally introduced into the unlocking channel, so that the locking effect persists. If the unlocking body is too long, it pushes the locking body out of the locking recess but penetrates into the receiving recess and then itself acts as a locking body that inhibits movement of the latch configuration. For that reason it is also preferred that the receiving recess be longer, along the displacement movement of the locking body, than the dimension of the locking body in that direction. Preferably the receiving recess is embodied to be more than 1.2 times, more preferably more than 1.4 times, longer than the locking body itself along the displacement movement direction of the locking body, so that the latter can be pushed back deep into the receiving recess.

In order to reduce the movement space required for its displacement movement, the latch configuration is preferably displaceable rotationally between the latching position and the release position.

In order to furnish the shortest possible transition range between inhibition of the displacement movement of the latch configuration by the locking body on the one hand and by the unlocking body on the other hand, it is preferred if, when the locking body is in the locking position, the locking body opening is located at a distance of no more than 1 mm, preferably no more than 0.5 mm, particularly preferably no more than 0.2 mm away from an outlet opening, located closest to it, of the receiving recess.

Because the information interface apparatus presented with the present Application is particularly suitable for use on an earth working machine, the present invention also relates to an operator's platform of an earth working machine having an information interface apparatus embodied as described above. The unlocking body is then preferably a key that selectably disallows and permits access to the operator's platform. The unlocking body is preferably the operating key of the earth working machine that comprises the operator's platform, which key must in any case be carried by the machine operator and without which the earth working machine cannot be put into service. This ensures that the information interface apparatus can always be made operationally ready, starting from a state having enhanced vandalism protection, when the earth working machine is to be put into service.

The present invention therefore also relates to an earth working machine having, in particular on its operator's platform, an information interface apparatus embodied as described above. The information interface apparatus may as well be provided at an external control panel that is arranged at a machine body of the earth working machine and allows for the control of the earth working machine outside its operator's platform, e. g. by an operator standing next to the earth working machine.

BRIEF DESCRIPTION OF THE DRAWINGS

The present invention will be explained in further detail below with reference to the appended drawings, in which.

DETAILED DESCRIPTION

Figure 1:
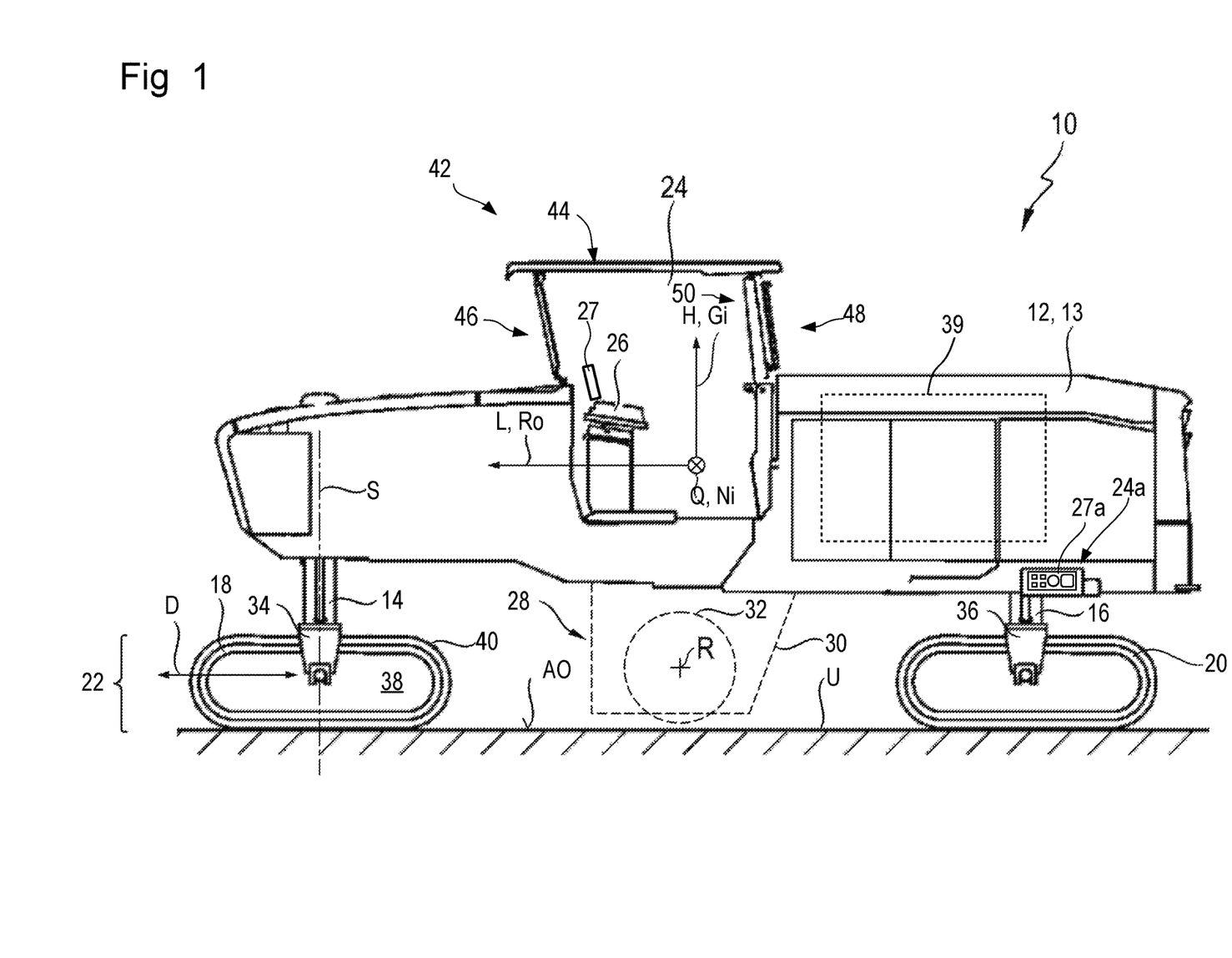
FIG. 1 is a schematic side view of an earth working machine in accordance with an embodiment of the present invention, having an information interface apparatus according to the present invention.

In FIG. 1, an embodiment according to the present invention of an earth working machine, in the form of a large earth milling machine or road milling machine, is designated in general as 10. It encompasses a machine frame 12 that constitutes the basic framework for a machine body 13. Machine body 13 encompasses machine frame 12 and components of machine 10 which are connected to machine frame 12 and if applicable are movable relative thereto.

Machine body 13 encompasses front lifting columns 14 and rear lifting columns 16, which are connected at one end to machine frame 12 and at another end respectively to front drive units 18 and to rear drive units 20. The distance of machine frame 12 from drive units 18 and 20 is modifiable using lifting columns 14 and 16.

Drive units 18 and 20 are depicted by way of example as crawler track units. Divergently therefrom, individual or all drive units 18 and/or 20 can also be wheel drive units.

The viewer of FIG. 1 is looking at the earth working machine, or simply "machine," 10 in transverse machine direction Q that is orthogonal to the drawing plane of FIG. 1. A longitudinal machine direction orthogonal to transverse machine direction Q is labeled L, and extends parallel to the drawing plane of FIG. 1. A vertical machine direction H likewise extends parallel to the drawing plane of FIG. 1 and orthogonally to longitudinal and transverse machine directions L and Q. The arrowhead of longitudinal machine direction L in FIG. 1 points in a forward direction. Vertical machine direction H extends parallel to yaw axis Gi of machine 10, longitudinal machine direction L extends parallel to roll axis Ro, and transverse machine direction Q extends parallel to pitch axis Ni.

Earth working machine 10 comprises an operator's platform 24 from which a machine operator can control machine 10 via an operating console 26. Operating console 26 comprises an information interface apparatus 27 in the form of an operating display. The earth working machine 10 has a further information interface apparatus 27a at an external control panel 24a which is mounted to the earth working machine 10 to be accessible from the side by a ground based operator standing next to the earth working machine 10 on the substrate U and which also allows to the ground based operator to control the earth working machine 10 while standing or walking alongside the earth working machine 10.

Arranged below machine frame 12 is a working subassembly 28 that here constitutes, by way of example, a milling subassembly 28 having a milling drum 32 that is received in a milling drum housing 30 and is rotatable around a milling axis R extending in transverse machine direction Q, so that substrate material can thereby be removed during earth working, proceeding from supporting surface AO of substrate U, to a milling depth determined by the relative vertical position of machine frame 12. Milling drum 32 is therefore a "working apparatus" as defined in the present Application. Alternatively or additionally, milling drum 32 can be received on machine frame 12 vertically adjustably relative thereto.

The vertical adjustability of machine frame 12 by way of lifting columns 14 and 16 also serves to set the milling depth, or generally working depth, of machine 10 during earth working. Earth working machine 10 that is depicted by way of example is a large milling machine for which the arrangement of milling subassembly 28 between front and rear drive units 18 and 20 in a longitudinal machine direction L is typical. Large milling machines, or earth-removing machines in general, of this kind can comprise a transport belt for transporting removed earth material away from machine 10. A transport belt that is also present in principle on machine 10 is not depicted in FIG. 1 in the interest of better clarity.

It is not apparent from the side view of FIG. 1 that machine 10 respectively comprises, in both its front end region and its rear end region, two lifting columns 14 and 16 each having a drive unit 18, 20 connected thereto. Front lifting columns 14 are each coupled to drive units 18, in a manner furthermore known per se, by means of a drive unit connecting structure 34, for example a connecting fork that fits over drive unit 18 in transverse machine direction Q. Rear lifting columns 16 are connected to their respective drive unit 20 via a drive unit connecting structure 36 constructed identically to drive unit connecting structure 34. Drive units 18 and 20 are of substantially identical construction and constitute propelling unit 22 of the machine. Drive units 18 and 20 are motor-driven, as a rule by a hydraulic motor (not depicted).

The drive energy source of machine 10 is constituted by an internal combustion engine 39 which is received on machine frame 12 and by which, in the exemplifying embodiment depicted, milling drum 32 is driven to rotate. The output of internal combustion engine 39 furthermore furnishes on machine 10 a hydraulic pressure reservoir with which hydraulic motors and hydraulic actuators on the machine are operable. Internal combustion engine 39 is thus also a source of the energy that advances machine 10.

In the example depicted, drive unit 18, having a running direction indicated by double arrow D, comprises a radially internal receiving and guidance structure 38 on which a recirculatable crawler track 40 is arranged and is guided to move peripherally.

Lifting column 14, and with it drive unit 18, is rotatable by means of a steering apparatus (not depicted in further detail) around a steering axis S. Preferably additionally but also alternatively, lifting column 16, and with it drive unit 20, can be rotatable by means of a steering apparatus around a steering axis parallel to steering axis S.

Operator's platform 24 is covered by a protective canopy structure 42 which encompasses a protective canopy 44 that is connected to machine frame 12 or machine body 13 respectively via a front panel arrangement 46 and a rear partition arrangement 48. Protective canopy 44 is arranged on machine frame 12 liftably and lowerably by means of a movement guidance system 50. Protective canopy 44 is shown in FIG. 1 in its lifted operating position in which machine 10 is ready for working operation.

Figure 2:
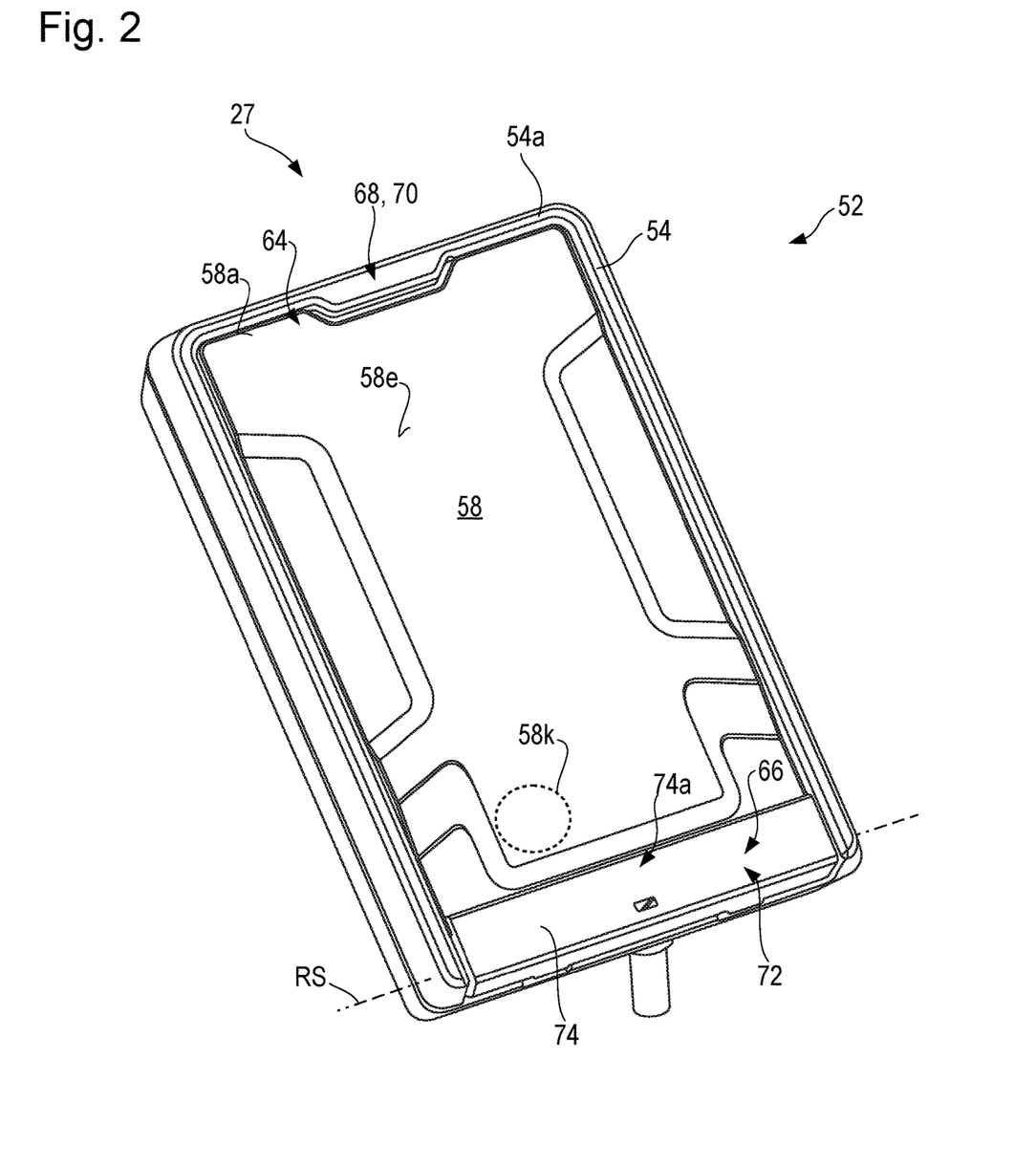
FIG. 2 is a schematic perspective view of the information interface apparatus according to the present invention shown in FIG. 1 having a protective plate in the covering position.

Information interface apparatus 27 of earth working machine 10 of FIG. 1 is depicted schematically in FIG. 2 in a perspective view. It encompasses an interface subassembly 52 that comprises a housing 54 and a functional surface 56 that is embodied for the input and/or output of information (see also FIG. 3).

As depicted in FIG. 2, information interface apparatus 27 is in a state of elevated vandalism protection in which a protective plate 58 is arranged on interface subassembly 52 in a covering position that covers the functional surface, and is secured against removal from functional surface 56.

Functional surface 56 has an output side 56a that faces toward the machine operator during use as intended, and oppositely from that side has a technology side 56b. In the present exemplifying embodiment, technology side 56b is completely enclosed by housing 54. Located between housing 54 and technology side 56b of functional surface 56 are, for example, electrical leads as well as electrical and electronic components that ensure operation of the functional surface for the input and output of information.

Functional surface 56 is to be understood in the present case as a planar component.

Figure 3:
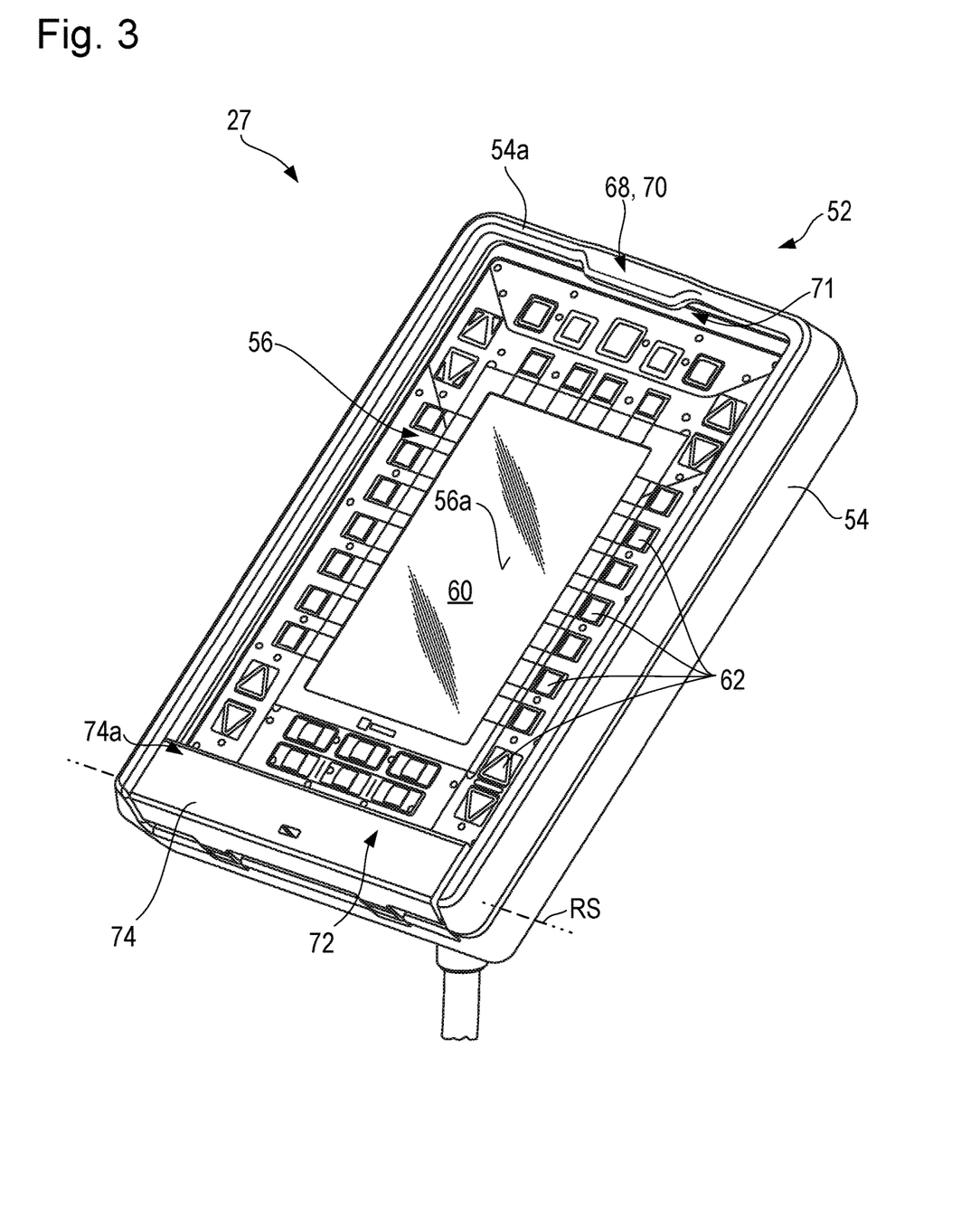
FIG. 3 is a schematic perspective view of the information interface apparatus according to the present invention of FIG. 2, in an operationally ready state without a protective plate, with an accessible functional surface.

Functional surface 56 comprises an image output surface 60 as well as a plurality of operating elements 62. Image output surface 60 serves predominantly for the output of information to the machine operator. Operating elements 62 serve predominantly for the input of information by the machine operator to a control device. In the interest of clarity, only some operating elements 62 are labeled with reference characters.

Functional surface 56 that interacts with electrical and electronic components is therefore a mechanically highly sensitive component that can be destroyed with even a small to moderate application of external force.

In order to protect functional surface 56 from unauthorized access and undesired application of force during times when earth working machine 10 is not in operation, protective plate 58 can be arranged on interface subassembly 52 as depicted in FIG. 2.

Protective plate 58, configured rectangularly by way of example, has for that purpose on its one narrow side, i.e. at its one longitudinal end, an anchoring portion 64 that is constituted by an edge portion 58a of protective plate 58.

At its oppositely located narrow portion or longitudinal end, protective plate 58 comprises a latching portion 66 that is constituted by an oppositely located edge portion 58b.

Housing 54 protrudes with a portion 54a beyond output side 56a in a direction away from technology side 56b, i.e. toward the machine operator who is viewing functional surface 56. Housing 54 has in this portion 54a a counterpart anchoring portion 68 that interacts with anchoring portion 64 in order to anchor protective plate 58 on interface subassembly 52. Counterpart anchoring portion 68 encompasses a protrusion 70 which preferably is embodied integrally with housing 54 and from which portion 54a, extending beyond output side 56a, of housing 54 projects from the remainder of housing 54 approximately parallel to the principal area of extent of functional surface 56.

The result is to form, between protrusion 70 of counterpart anchoring portion 68 and the remainder of housing 54, a groove 71 (see FIG. 5) into which anchoring portion 64 can be introduced. This groove 71, like protrusion 70, is rigid. Anchoring portion 64 can thus be introduced into groove 71 of counterpart anchoring portion 68 and can be secured by counterpart anchoring portion 68 in positively engaged fashion against removal, i.e. substantially against being lifted, from functional surface 56.

Also provided on housing 54 is a counterpart latching portion 72 that interacts with latching portion 66 of protective plate 58 and comprises a movable latch component 74 having a latch configuration 74a.

Figure 4:
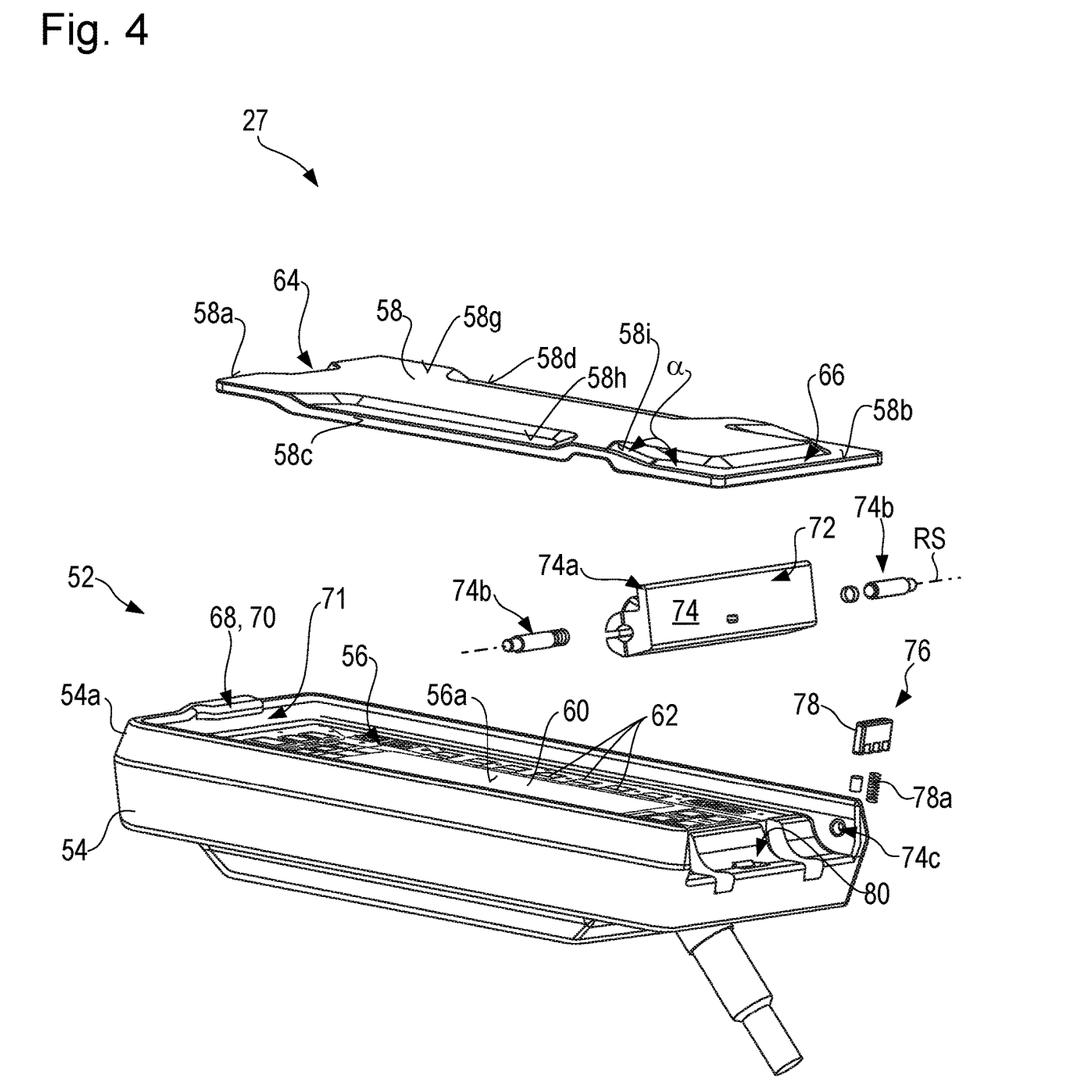
FIG. 4 is a schematic exploded view of the information interface apparatus according to the present invention of FIG. 2.

Latch configuration 74a is embodied integrally with latch component 74 and is pivotable around a latch pivot axis RS with reference to the remainder of housing 54. When latching portion 66 is in latching engagement with counterpart latching portion 72, latch pivot axis RS is oriented parallel to edge 58b of protective plate 58 which forms latching portion 66 (see FIGS. 4 and 5). Said axis is defined by preferably telescopable axial subassemblies 74b which are spring-preloaded in an extension direction, and which can be received in latch component 74 and can project into corresponding mounting recesses 74c on the remainder of housing 54.

Figure 5:
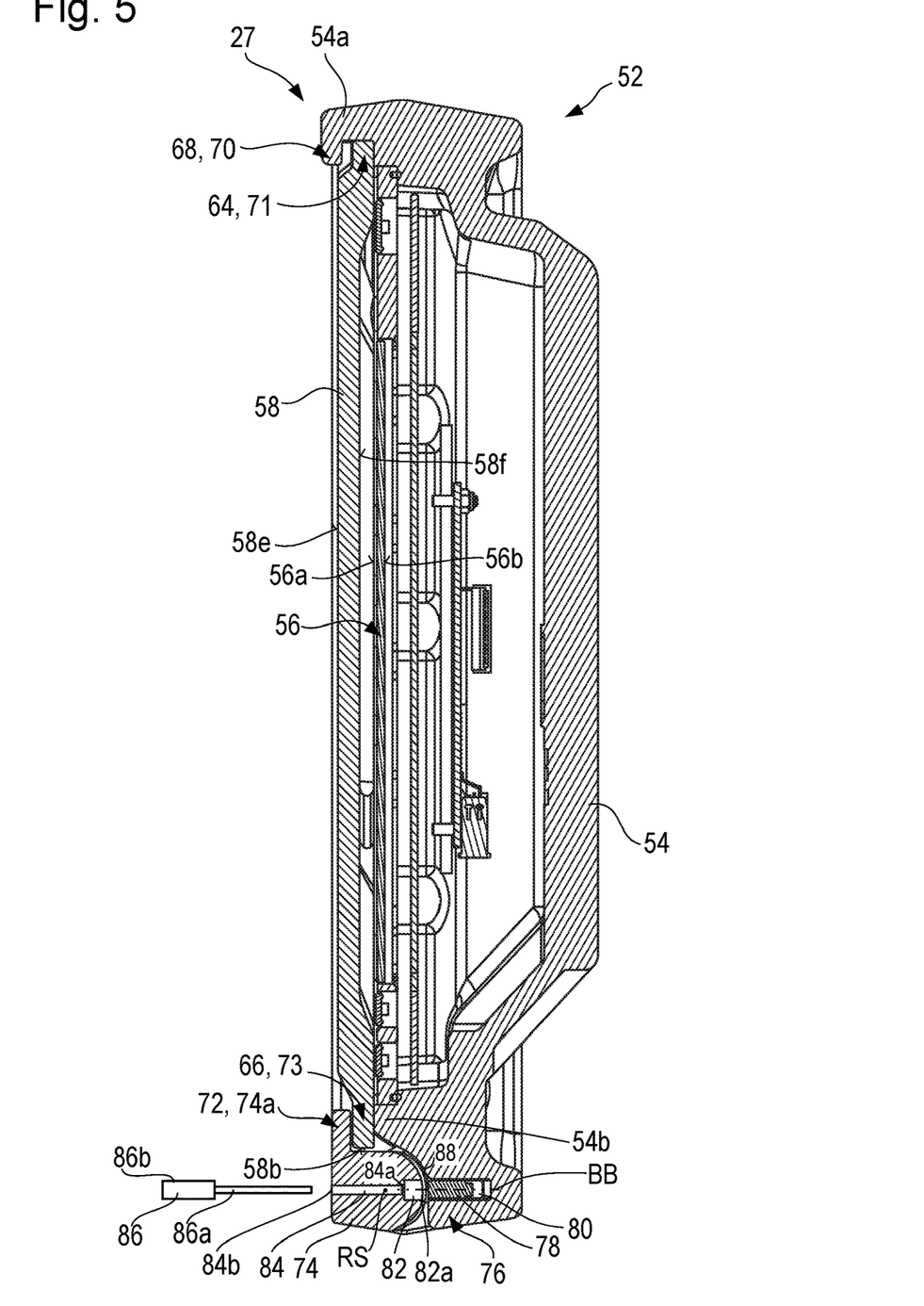
FIG. 5 is a schematic longitudinal section view of the information interface apparatus according to the present invention of FIG. 2.

FIG. 5 depicts the manner in which latch configuration 74a holds latching portion 66, constituted by edge 58b, in positive engagement in a groove 73 that is constituted between latch configuration 74a and a housing protrusion 54b located opposite it in the latching position shown in FIG. 5. The positive engagement of latching portion 66 by way of latch configuration 74a, in interaction with housing protrusion 54b, corresponds substantially to the positive engagement of anchoring portion 64 in groove 71 by way of protrusion 70 of counterpart anchoring portion 68. In its covering position as shown, for example, in FIGS. 2 and 5, protective plate 58 is thus secured by positive engagement, at its oppositely located longitudinal ends having counterpart anchoring portion 68 and counterpart latching portion 72, against removal from functional surface 56. As shown especially in FIG. 2, latch configuration 74a in its latching position preferably covers edge 58b of the protective plate over its entire length between longitudinal edges 58c and 58d.

Housing 54 preferably surrounds protective plate 58 in its covering position at all edges, and also projects beyond protective plate 58 in a direction away from output side 56a. At edges 58a and 58b respectively constituting anchoring portion 64 and latching portion 66, housing 54 (latch configuration 74a being, as a part of latch component 74, a movable part of housing 54) fits around protective plate 58. Housing part 54a that protrudes toward the machine operator, beyond output side 56a of functional surface 56, during use as intended is located with a narrow gap opposite longitudinal edges 58c and 58d (see FIG. 4) of protective plate 58 which connect anchoring portion 64 to latching portion 66. Preferably the sum of the gap widths between the two edges 58c and 58d and housing portion 54a located opposite them is less than 1 mm. That gap dimension is sufficient for rapid and convenient placement of the protective plate in the covering position, but makes it difficult to lever a tool into the gap. Preferably the gap widths are less than 0.8 mm in total.

Latch configuration 74a is shown in its latching position in FIG. 5. With information interface apparatus 27 in the state shown in FIG. 5, said configuration can be displaced counterclockwise (when viewing FIG. 5) around latching pivot axis RS into a release position in which the positive engagement between latch configuration 74a and latching portion 66 is disengaged so that latching portion 66 can then be lifted away from housing projection 54b past latch configuration 74a in the release position and, with protective plate 58 in the oblique position thereby achieved, anchoring portion 64 can be pulled out of the positive engagement with groove 71 of counterpart anchoring portion 68.

The displacement of latch configuration 74a from the latching position shown in FIG. 5 into a release position pivoted counterclockwise away therefrom can only occur, however, when a locking apparatus 76 enables the corresponding displacement movement of latch configuration 74a or of latch component 74.

In the preferred exemplifying embodiment depicted, locking apparatus 76 encompasses a locking body 78 that is received in a receiving recess 80 in that part of housing 54 which movably receives latch component 74. Receiving recess 80 defines a preferably straight-line translational motion path BB along which locking body 78 is received movably in receiving recess 80. Receiving recess 80 has a larger dimension along movement path BB than locking body 78, so that locking body 78 can be moved translationally in receiving recess 80 without leaving receiving recess 80.

Latch component 74 comprises a locking recess 82 into which locking body 78 can enter, from its receiving recess along movement path BB, when locking recess 82 and receiving recess 80 are aligned with one another. That is the case when latch configuration 74a is in the latching position.

Locking recess 82 has a shorter dimension than locking body 78 along movement path BB, so that locking body 78, emerging from its receiving recess 80 through a locking body opening 82a of locking recess 82, can enter locking recess 82 but cannot completely leave receiving recess 80 even when maximally introduced into locking recess 82.

Locking body 78 is preloaded by a spring 78a into its locking position in which it is located both in locking recess 82 and in its receiving recess 80. Spring 78a is visible only in FIG. 4, but not in FIG. 5.

Locking body 78 is thus displaced by spring 78a into the locking position when latch component 74 having latch configuration 74a is moved into the latching position. In that latching position, locking body 78, which is located both in locking recess 82 and in receiving recess 80, physically prevents a relative movement of latch component 74 relative to the remainder of housing 54.

Latch component 74 comprises an unlocking channel 84 for unlocking latch configuration 84a. That channel opens at an unlocking opening 84a into locking recess 82, and extends as far as an introduction opening 84b on the outer side of latch component 84.

By way of an unlocking body 86, preferably embodied by the operating key of earth working machine 10, a locking body 78 can be pushed out of the locking position back into its enabling position shown in FIG. 5. For that purpose, for example, bit 86a that embodies the secure locking mechanism of key 86 is introduced through introduction opening 84b into unlocking channel 84 until bow portion 86b of key 86, which can no longer fit through introduction opening 84b, abuts against the outer surface of latch component 74. With unlocking body 86 in this position introduced entirely into unlocking channel 84, locking body 78 is pushed back against the preload force of spring 78a exactly into the position shown in FIG. 5, so that latch component 84, and with it latch configuration 74a, can be pivoted around latch pivot axis RS.

Unlocking channel 84, locking recess 82, and a gap 88 that may exist between latch component 84 and the remainder of housing 54 are coordinated with operating key 86 of earth working machine 10 in terms of dimensions in such a way that the pushing of locking body 78 into the enabling position can occur in the manner described.

If an unlocking body that is shorter than necessary is introduced into unlocking channel 84, locking body 78 is not moved completely out of the locking recess and maintains its locking action.

If an unlocking body that is longer than the correct unlocking body 86 is introduced into unlocking channel 84, it forces the locking body deep into receiving receptacle 80 and itself projects into the receiving receptacle, so that the overly long unlocking body then performs the locking action originally effected by locking body 78.

Housing 54, with the exception of latch component 74, is preferably embodied in one piece, for example as a mechanically robust plastic component, particularly preferably as a plastic component reinforced with fibers and/or particles. Foamed polyurethane is preferred as a plastic.

Protective plate 58 can likewise be a plastic component or can at least encompass such a plastic. Foamed polyurethane is again preferred as a plastic. Protective plate 58 can additionally comprise a metal core made of sheet metal.

Housing 54, with the exception of latch component 74, is preferably embodied as a one-piece pan, so that it exhibits a minimum of joins that could be weak points in the context of a vandalism attack. Protective plate 58 is also preferably in one piece, or at most in two pieces if the aforementioned metal core were to be used.

Visible side 58e of protective plate 58, which preferably faces away from functional surface 76 when protective plate 58 is in the covering position, is preferably embodied in profiled fashion in order to enhance the flexural stiffness of the protective plate around flexural axes parallel to the principal area of extent of protective plate 58. The protective plate can have for that purpose at least one protrusion 58g that projects with respect to a base region 58h. In order to make tool engagement against the at least one protrusion 58g more difficult, the latter is connected to base region 58h via a bevel 58i. Bevel angle α is equal to at least 130°.

Located oppositely from visible side 58e of protective plate 58 is its functional surface side 58f which, when protective plate 58 is in the covering position shown in FIGS. 2 and 5, is located opposite output side 56a of functional surface 56 at a small, maximally constant distance.

As indicated in FIG. 2 with dashed lines and reference character 58k, protective plate 58 can comprise an actuation opening 58k that passes through it from visible side 58e to functional-surface side 58f so that at least one, preferably exactly one, highly safety-relevant operating element of functional surface 56 can be reached even when it is covered by protective plate 58. For example, an emergency shutoff switch of information interface apparatus 27 can be reachable at any time even when the functional surface is covered. Actuation opening 58k has dimensions that just allow a finger to be inserted for actuation of the operating element. Alternatively, the operating element associated with actuation opening 58k can be flush with visible side 58e or can project beyond visible side 58e. The further configuration of protective plate 58 is not relevant to the provision of actuation opening 58k.

The invention claimed is:

1. An information interface apparatus for an earth working machine, the apparatus comprising:

an interface subassembly, including a housing and a functional surface received in the housing, the functional surface being configured to input and output information;

a protective plate embodied separately from the interface subassembly, the protective plate being configured to cover the functional surface, the protective plate including an anchoring portion and a latching portion, the latching portion being separate from the anchoring portion;

the interface subassembly including a counterpart anchoring portion and a counterpart latching portion;

wherein the anchoring portion of the protective plate is anchorable on the counterpart anchoring portion of the interface subassembly such that the anchoring portion is securable against removal from the functional surface; and wherein the latching portion of the protective plate is releasably latchable by the counterpart latching portion of the interface subassembly such that the latching portion is securable against removal from the functional surface;

wherein the counterpart latching portion includes a latch configuration displaceable between a latching position and a release position;

wherein in the latching position, when the anchoring portion is anchored on the counterpart anchoring portion, a positive engagement between the latching portion and the counterpart latching portion prevents removal of the latching portion from the functional surface; and wherein in the release position, when the anchoring portion is anchored on the counterpart anchoring portion, the latching portion is removable from the functional surface.

2. The information interface apparatus of claim 1, wherein:

the anchoring portion and the latching portion are provided at mutually opposite longitudinal ends of the protective plate.

3. The information interface apparatus of claim 1, wherein:

the functional surface includes an output side facing away from the housing during operation, and the functional surface includes a technology side located oppositely from the output side and facing toward the housing; and the housing protrudes beyond the output side of the functional surface.

4. The information interface apparatus of claim 1, wherein:

one of the anchoring portion and the counterpart anchoring portion includes at least one of a protrusion and a groove.

5. The information interface apparatus of claim 4, wherein:

the counterpart anchoring portion includes the protrusion and the groove, the protrusion being formed on the housing and extending parallel to the functional surface, the protrusion together with the housing defining the groove; and the anchoring portion of the protective plate being introducible into the groove for anchoring the protective plate on the interface subassembly.

6. The information interface apparatus of claim 2, further comprising: a locking apparatus provided on the interface subassembly, the locking apparatus being configured to lock the latch configuration to inhibit a displacement movement of the latch configuration from its latching position.

7. The information interface apparatus of claim 6, wherein:
the interface subassembly defines a support structure which carries the latch configuration displaceably relative to the support structure;
the locking apparatus including a locking body displaceably received in the support structure between a locking position inhibiting a displacement movement of the latch configuration, and an enabling position permitting the displacement movement of the latch configuration;
the latch configuration including a locking recess movable with the latch configuration and into which the locking body projects in the locking position so as to inhibit the displacement movement of the latch configuration.

8. The information interface apparatus of claim 1, in combination with an operator's platform for the earth working machine.

9. The information interface apparatus of claim 1, in combination with an external control panel for the earth working machine.

10. The information interface apparatus of claim 1, in combination with an operator's platform and the earth working machine.

11. The information interface apparatus of claim 1, in combination with an external control platform and the earth working machine.

12. The information interface apparatus of claim 1, wherein the anchoring portion can be removed from an anchoring engagement with the counterpart anchoring portion only when the latching portion is not in latching engagement with the counterpart latching engagement.

13. The information interface apparatus of claim 1, wherein the protective plate is formed as a single piece.

14. The information interface apparatus of claim 1, wherein the protective plate is entirely separable from the interface subassembly.

15. An information interface apparatus for an earth working machine, the apparatus comprising:
an interface subassembly, including a housing and a functional surface received in the housing, the functional surface being configured to input and output information;
a protective plate embodied separately from the interface subassembly, the protective plate being configured to cover the functional surface, the protective plate including an anchoring portion and a latching portion, the latching portion being separate from the anchoring portion;
the interface subassembly including a counterpart anchoring portion and a counterpart latching portion;
wherein the anchoring portion of the protective plate is anchorable on the counterpart anchoring portion of the interface subassembly such that the anchoring portion is securable against removal from the functional surface; and
wherein the latching portion of the protective plate is releasably latchable by the counterpart latching portion of the interface subassembly such that the latching portion is securable against removal from the functional surface,
wherein one of the latching portion and the counterpart latching portion includes a latch configuration displaceable between a latching position and a release position;
wherein in the latching position, when the anchoring portion is anchored on the counterpart anchoring portion, a positive engagement between the latching portion and the counterpart latching portion prevents removal of the latching portion from the functional surface; and
wherein in the release position, when the anchoring portion is anchored on the counterpart anchoring portion, the latching portion is removable from the functional surface;
wherein the information interface apparatus further comprises:
a locking apparatus provided on one of the interface subassembly and the protective plate, the locking apparatus being configured to lock the latch configuration to inhibit a displacement movement of the latch configuration from its latching position;
wherein one of the interface subassembly and the protective plate defines a support structure which carries the latch configuration displaceably relative to the support structure;
the locking apparatus including a locking body displaceably received in the support structure between a locking position inhibiting a displacement movement of the latch configuration, and an enabling position permitting the displacement movement of the latch configuration;
the latch configuration including a locking recess movable with the latch configuration and into which the locking body projects in the locking position so as to inhibit the displacement movement of the latch configuration;
wherein the locking recess includes a locking body opening through which the locking body enters into and emerges from the locking recess; and
wherein the locking recess includes an unlocking opening through which an unlocking body is introducible in order to push the locking body out of the locking recess, the unlocking opening being different from the locking body opening.

16. The information interface apparatus of claim 15, wherein:
the latch configuration includes an unlocking channel having one end open at the unlocking opening into the locking recess, and the unlocking channel having another end accessible from an external environment of the information interface apparatus.

17. The information interface apparatus of claim 16, wherein:
the locking body is received in the support structure in a receiving recess, the locking body being displaceable only in a straight-line trajectory; and
the unlocking channel and the receiving recess are aligned with one another when the locking body is in the locking position.

18. The information interface apparatus of claim 17, wherein:
when the locking body is in the locking position, the locking body opening is located at a distance of no more than 1 mm away from an outlet opening, located closest to the locking body opening, of the receiving recess.

19. The information interface apparatus of claim 18, wherein:
the distance is no more than 0.5 mm.

20. The information interface apparatus of claim 18, wherein:
the distance is no more than 0.2 mm.

21. An information interface apparatus for an earth working machine, the apparatus comprising:

an interface subassembly, including a housing and a functional surface received in the housing, the functional surface being configured to input and output information;
a protective plate formed as a single piece entirely separable from the interface subassembly, the protective plate being configured to cover the functional surface, the protective plate including an anchoring portion and a latching portion, the latching portion being separate from the anchoring portion;
the interface subassembly including a counterpart anchoring portion and a counterpart latching portion;
wherein the anchoring portion of the protective plate is anchorable on the counterpart anchoring portion of the interface subassembly such that the anchoring portion is securable against removal from the functional surface; and
wherein the latching portion of the protective plate is releasably latchable by the counterpart latching portion of the interface subassembly such that the latching portion is securable against removal from the functional surface.

* * * * *